UNITED STATES PATENT OFFICE.

WM. PETERS, OF BALTIMORE, MARYLAND, ASSIGNOR TO HIMSELF AND ROBERT B. PORTER.

IMPROVED PACKING FOR STEAM AND OTHER ENGINES.

Specification forming part of Letters Patent No. 34,283, dated January 28, 1862.

*To all whom it may concern:*

Be it known that I, WILLIAM PETERS, of the city of Baltimore, in the State of Maryland, have invented a certain new and useful Improved Packing for Steam, Water, and other Joints; and I do hereby declare the following to be a full, clear, and exact description of the making and using of the same.

My packing is composed of the mineral known as "asbestus" and any vegetable or animal fiber or material. I have used flax, wool, and cotton in making the packing; but either one of these articles alone or the whole may be used with the asbestus. What I have made thus far has been made by placing layers of asbestus and layers of flax or wool alternately in a tub of water, through the bottom of which entered tubes conveying steam. In this way the materials have been subjected to the heat of the steam and the mass made to assume the condition of pulp. After exposing the mass for a sufficient length of time to bring it to the pulpy condition I have taken it out, laid it upon an even surface, and compressed it into plates or boards of the thickness I required it. For packing the heads of cylinders one-quarter of an inch thickness of board will answer; but, as is evident, any degree of thickness can be produced.

Other means of exposing the mass to heat in a fluid can be adopted, and other fluid than water may be used, as the use or purpose for which the packing may be intended may indicate.

For packing stuffing-boxes and pistons the mass may be compressed in molds to the form desired.

Any animal or vegetable fiber or material that can be brought to the consistence of pulp can be used with the asbestus to form this packing. There may be circumstances—such as the degree of heat or of moisture—which will lead to a preference for one material over another.

This packing is particularly useful in high-pressure engines and in all machines or apparatus where exposure to a high degree of heat occurs, as it is also when great pressure is exerted and where packing is subjected to the action of acids or other corrosive fluids.

What I claim as my invention, and desire to secure by Letters Patent, is—

The packing herein described for steam and other joints, composed of asbestus and vegetable or animal fiber or material.

WM. PETERS.

Witnesses:
   THOS. T. EVERETT,
   JOHN S. HOLLINGSHEAD.